US007155875B2

(12) United States Patent
Henderson

(10) Patent No.: US 7,155,875 B2
(45) Date of Patent: *Jan. 2, 2007

(54) METHOD OF FORMING A PERIMETER WEIGHTED FOUNDATION FOR WIND TURBINES AND THE LIKE

(76) Inventor: Allan P. Henderson, 2005 Airport Dr., Bakersfield, CA (US) 93308

(*) Notice: Subject to any disclaimer, the term of this patent is extended or adjusted under 35 U.S.C. 154(b) by 177 days.

This patent is subject to a terminal disclaimer.

(21) Appl. No.: 10/717,629

(22) Filed: Nov. 21, 2003

(65) Prior Publication Data

US 2004/0098935 A1 May 27, 2004

Related U.S. Application Data

(60) Division of application No. 10/067,999, filed on Feb. 8, 2002, now Pat. No. 6,672,023, which is a continuation of application No. 09/671,282, filed on Sep. 27, 2000, now abandoned.

(51) Int. Cl.
*E04B 1/00* (2006.01)
*E04G 21/00* (2006.01)
*E04G 23/00* (2006.01)

(52) U.S. Cl. .............................. 52/741.15; 52/742.14; 52/294; 52/296; 52/223.4

(58) Field of Classification Search ................. 52/294, 52/295, 296, 741.11, 741.14, 741.15, 742.14, 52/223.4, 223.5; 405/229, 232, 233, 236, 405/237, 238, 239, 242, 249
See application file for complete search history.

(56) References Cited

U.S. PATENT DOCUMENTS 274,261 A * 3/1883 Bowlus ........................ 416/11
274,638 A * 3/1883 Mould ......................... 52/103
3,793,794 A * 2/1974 Archer et al. ................. 52/632
3,916,635 A * 11/1975 Lynch et al. ................ 405/253
4,217,738 A * 8/1980 Smith ............................ 52/40
4,406,094 A * 9/1983 Hempel et al. ................ 52/40
4,918,891 A * 4/1990 Gerszewski .................. 52/295
5,131,790 A * 7/1992 Simpson .................... 405/236
5,586,417 A * 12/1996 Henderson et al. ........... 52/295

(Continued)

FOREIGN PATENT DOCUMENTS

JP     58-166195    * 10/1983

(Continued)

*Primary Examiner*—Naoko Slack
*Assistant Examiner*—Chi Q. Nguyen
(74) *Attorney, Agent, or Firm*—Jacobson Holman PLLC

(57) ABSTRACT

A perimeter weighted foundation has a central pier pedestal and an enlarged base spaced outwardly and extending below the pedestal. The enlarged base includes an outer concentric perimeter wall section with a radially extending, disk-shaped spread section interconnecting the bottom of the pedestal section and the top of the perimeter wall section. The pedestal section includes vertically extending post-tensioning anchor bolts sleeved through substantially the entire height of the cylindrical pedestal in accordance with earlier U.S. Pat. Nos. 5,586,417 and 5,826,387 and the spread section includes two layers of similarly sleeved post-tensioning bolts which extend through the bottom of the pedestal section and into or through the top of the perimeter wall section, thus tying together the enlarged base to the pier pedestal. After the concrete is poured, hardened and cured, the vertical bolts of the pedestal section and the radially extending horizontal bolts in the spread section are post-tensioned to impart a heavy unit compressive loading on the concrete in the pier pedestal and enlarged base. After back filling soil onto the spread section and to the interior of the pedestal section, the foundation is able to withstand high upset forces imparted to the foundation by any large structure supported thereon.

12 Claims, 9 Drawing Sheets

U.S. PATENT DOCUMENTS

| | | | |
|---|---|---|---|
| 5,625,988 A * | 5/1997 | Killick | 52/298 |
| 5,761,875 A * | 6/1998 | Oliphant et al. | 52/721.2 |
| 5,826,387 A * | 10/1998 | Henderson et al. | 52/295 |
| 5,878,540 A * | 3/1999 | Morstein | 52/296 |
| 6,119,425 A * | 9/2000 | Shimonohara | 52/439 |
| 6,216,414 B1 * | 4/2001 | Feldberg | 52/736.1 |
| 6,270,308 B1 * | 8/2001 | Groppel | 415/4.3 |
| 6,532,700 B1 * | 3/2003 | Maliszewski et al. | 52/40 |
| 6,672,023 B1 * | 1/2004 | Henderson | 52/296 |

FOREIGN PATENT DOCUMENTS

JP  6-316942  * 11/1994

* cited by examiner

METHOD OF FORMING A PERIMETER WEIGHTED FOUNDATION FOR WIND TURBINES AND THE LIKE

This is a division of application Ser. No. 10/067,999, filed Feb. 8, 2002, now U.S. Pat. No. 6,672,023 issued Jan. 6, 2004, which in turn is a continuation of application Ser. No. 09/671,282 filed Sep. 27, 2000, now abandoned, the disclosure thereof being incorporated by reference as if fully set forth herein.

BACKGROUND OF THE INVENTION

1. Field of the Invention

This invention relates to concrete foundations, and more particularly, to reinforced concrete pier foundations useful for the support of tall, heavy and/or large towers which may be used to support power lines, communication systems, street lighting and signals, bridge supports, commercial signs, freeway signs, ski lifts and the like, and especially wind turbines which are subject to very high upset forces.

2. Background of the Invention

Various different forms of foundations utilizing some of the general structural and operational features of the instant invention have been known. However, these previously known foundations do not include some of the basic features of the instant invention. The combination of features incorporated in the disclosed embodiments of the instant invention enable a heavy duty foundation to be formed in situ or be precast and transported to the construction site, and be placed in position in a manner not requiring the use of large drilling rigs or pile drivers. The present invention is particularly useful in locations where the ground water is high and/or the depth clearance for placement of the foundation is low. The foundation of the present invention is capable of resisting very high upset loads and in a manner independent of the concrete of the foundation experiencing alternating localized compression and tension loading.

In a conventional concrete pier foundation the concrete bears the compressive loads and the contained reinforcing bars (rebar) are sized to bear the tensile loads. Anchor bolts are typically utilized solely for the purpose of attaching the supported structure to the foundation. The anchor bolts are typically placed within a reinforcing steel (rebar) matrix or cage using a removable template at the top and a separate anchor plate at the bottom of each bolt to prevent anchor bolt pullout. The entire module is poured in concrete. Conventional foundations typically resist overturning movement by their weight.

Further, when the foundation is loaded by the structure supported thereon, the foundation is subjected to varying tensile and compressive loads with there being a boundary at the bolt anchor plates where the loading on the concrete alternates from a compressive load to a tensile load depending upon the various forces on the supported structure. The tensile load from the overturning moment of the supported structure is applied near the top of the foundation by the anchor bolts and subjects the large portion of the foundation below the point of application to tension. The large foundation typically requires a great amount of reinforcing steel and a large amount of concrete to encase the reinforcing steel. Extensive labor is also necessary to assemble the reinforcing steel matrix and fill the volume of the foundation with concrete and fix the anchor bolts. A typical cylindrical foundation also requires the use of a large drill to excavate the hole.

My two prior U.S. patents, U.S. Pat. Nos. 5,586,417 and 5,826,387, hereby incorporated by reference in their entirety as if fully set forth, are hereinafter sometimes referred to as "my prior patents". My prior patents disclose concrete pier foundations under high unit compression which eliminate the necessity for large quantities of reinforcing steel bars (rebar or tension bars) and substantially reduce the amount of concrete necessary. Therefore, the cost of these foundations is substantially less when compared to conventional designs. Furthermore, the foundations of my prior patents simplify the placement of the supported structure on the foundation and eliminate alternating cyclical compression and tension loading on the foundation, thereby substantially reducing fatigue. Also, these patented foundations allow for the replacement of the tower anchor bolts in the unlikely event of bolt failure and allow for removal of the upper four to five feet of the foundation in the event such action is desired for decommissioning purposes.

The foundations of my prior patents are preferably in the shape of a concrete cylinder. The outer boundary shell of the concrete may be formed by corrugated metal pipe (CMP). The inner boundary, preferably in large hollow cylinder foundations, also may be formed by CMP of a lesser diameter. Elongated high strength steel bolts are positioned around the periphery of the concrete cylinder and extend from a peripheral anchor plate or ring near the bottom of the cylinder vertically up through the concrete portion of the foundation to a peripheral connecting plate or flange adjacent the upper end of the structure. The bolts are received in "hollow tubes" to isolate the bolts from the concrete. The steel bolts preferably serve as anchor bolts for attachment of the base flange of the supported tower structure, and the anchor bolt pattern may thus be determined by the bolt hole pattern on the lower base plate or flange of the supported tower. The steel bolt pattern may also be engineered into the construction of the foundation by a removable template.

The "hollow tubes" are preferably elongated plastic tubes or sleeves which encase the bolts substantially through the entire vertical extent of the concrete and prevent the bolts from adhering to the concrete. Then, the bolts can be tensioned after the concrete has hardened and cured in order to post-tension the entire concrete foundation. Alternatively, the elongated bolts can be wrapped in plastic tape, or otherwise sheathed to prevent the bolts from adhering to the concrete during curing and allow the bolts to stretch under tension over the entire operating length of the bolt through substantially the full vertical extent of the concrete. There is typically no conventional rebar reinforcing steel in the foundation, except perhaps in large foundations where a small amount of incidental rebar may be used to stabilize the bolts during construction of the foundation.

The center of a large hollow cylindrical foundation according to my prior patents is filled with excavated soil and then capped. Excavation for the foundation may be done using widely available, fast, low cost excavating machines instead of relatively rare, slow, costly drills necessary for conventional cylindrical foundations.

The foundations of my prior patents use the mechanical interaction with the earth to prevent overturning instead of the mass of the foundation typically used by other foundations for turbine towers and other large structures subject to high upset forces. The high strength anchor bolts are tightened to provide heavy tension on the foundation from a heavy top flange through which the bolts pass to the anchor flange or plate adjacent the bottom of the foundation, thereby post-stressing the concrete in great compression and placing the entire foundation, between the heavy top plate or flange and lower anchor plate or flange, under high unit compression loading. The bolts are tightened so as to exceed the maximum internal tension expected from overturning forces of the tower structure on the foundation. Therefore, the entire foundation withstands the various loads with the concrete thereof always remaining in compression and the bolts always in static tension. The concrete pier foundations of my prior patents may be formed in situ in a remote location or be formed in a pre-cast concrete section placed under heavy compression.

To describe a portion of the foundation structure incorporated in the foundation of the present invention, reference is now made to FIGS. 1, 2 and 2A which are taken from my prior patents. In these Figures, the numeral 10 generally designates the pier foundation. The foundation 10 includes inner and outer upstanding corrugated metal pipe (CMP) sections 12 and 14. The outer section 14 is initially placed within a hole or excavation 16 formed in the ground 18 and rests upon the bottom of the excavation 16. The inner section 12 is then placed and positioned within the excavation 16. The interior of the inner CMP 12 is partially back filled and the excavation 16 outwardly of the outer CMP 14 is partially back filled to stabilize the CMP sections generally in position within the excavation and relative to each other.

The foundation 10 additionally includes a series of tensioning bolts 20 and 21 spaced circumferentially about the annulus defined between sections 12 and 14. The tensioning bolts are preferably in side-by-side pairs which are spaced radially from the center of the foundation. In a typical embodiment, the inner ring of bolts 20 has a slightly shorter diameter than the outer ring of bolts 21. Forty-eight tensioning bolts 20 and forty-eight tensioning bolts 21, or a total of ninety-six, are provided. The rings of bolts have diameters which are several inches apart and which generally equal about 12 feet.

The lower ends of the bolts 20 and 21 are anchored to a lower annular plate or anchor ring 22, sometimes also called an embedment ring, which preferably may be constructed of several circumferentially butted and joined sections. The anchor or embedment ring 22 is radially spaced relative to the inner CMP section 12 preferably by utilizing circumferentially spaced horizontal and radially extending positioning bolts 24 threaded through nuts 26 secured to the under side of the anchor ring 22 at points spaced circumferentially thereabout. Further, the bolts 20 and 21 have all but their opposite ends slidingly received through hollow tubes, such as PVC pipes 30, which are sized to receive and loosely grip bolts 20 and 21 but still permit free movement therethrough. The hollow tubes or PVC tubing 30 need not extend through the entire vertical height of concrete 68, but only through as much of the central portions and extending as close to the top and bottom as to allow the tensioning bolts to extend evenly through the concrete during post-tensioning.

The PVC pipes 30 and other suitable tubing or isolating mechanism serve to allow bolts 20 and 21 to move relatively freely through the concrete after curing so as to allow post-tensioning of the elongate bolts 20 and 21. In addition, rebar wraps 28 are used and secured to the tubes 30 associated with outer bolts 21 at approximately five foot intervals along the vertical extent of the bolts 21 in order to maintain the bolts longitudinally straight during the pour of concrete.

The upper ends of the bolts 20 are supported from a template 32 which consists of upper and lower rings 34 and 36 or ring sections secured together. Upwardly opening radial channel members 38 and mounting blocks 40 received in the channel members 38 are clamped between the upper and lower rings 34 and 36 through the utilization of upper and lower nuts 42 and 44 threaded on the bolts 20 and 21. The inner ends of the radial channel members 38 are joined by a center circular plate 46. The inner portions of the radial channel members 38 include lateral stabilizers 45 in the form of inverted channel members downwardly embracingly engaged thereover and equipped with opposite side set screws 47 clamp engaged with the corresponding channel members 38. The depending flanges of the channel members 45 are slotted for stabilizing engagement with adjacent upper edge portions of the inner pipe 12 while the outer ends of the channel members 38 include threadingly adjustable channel member feet 50 abutingly engageable with the ground 18. A cylindrical form plate 52 is clamped about the upper end of the outer pipe 14 and has its opposite ends secured together in overlapped relation.

Thereafter, concrete 68 may be poured to the bottom of each of the radial channel members 38 and to the top of each of the blockout bodies 64. After the concrete 68 has hardened, the upper nuts 42 are removed and the entire template 32 including the upper and lower rings 34 and 36, the channel members 38 and attached feet 50 are lifted up from the bolts 20 and 21 and the form plate 52, the blockout bodies 64 being exposed from above by removal of the template 32 to thus allow removal of the blockout bodies 64.

When the concrete 68 has sufficiently hardened, it must be determined that the groove 70 is level. If groove 70 is not level, a coating of high compression hardenable grout should be placed within the groove 70 to achieve a levelness for the tower base. Further, even if groove 70 is level, it may be desirable to place grout in the groove 70 as illustrated in FIG. 8 of my U.S. Pat. No. 5,586,417. The nuts 44 are removed or threaded downwardly on the bolts 20 and 21 at least ¾ inch. A tower (not shown) to be supported from the foundation 10 is thereafter lowered into position with the upper exposed ends of the bolts 20 and 21 upwardly received through suitable bores formed in the inner and outer peripheries of the heavy annular plate or base flange of the tower and the lower lug defining portion of the base flange seated in the groove or grout trough 70. Initially the upper nuts 42 are again threaded down onto the upper ends of the bolts 20 and 21 and preferably torqued to about 50 foot pounds. The nuts 42 are thereafter sequentially torqued (in a predetermined pattern of tightening) preferably to about 600 foot pounds which places each of the bolts 20 and 21 under approximately 40,000 pounds tension at approximately ⅓ the stretch limit of the bolts 20 and 21.

As illustrated in FIG. 1 and as described in my U.S. Pat. No. 5,586,417, column 8, in lines 37–43, the backfill within the inner pipe 12 may be completed to substantially ground level and provided with a poured concrete cap 86. The cap 86 may be sloped toward the center thereof and provided with a draining conduit 88, and a conduit 90 for electrical conductors (not shown) also may be incorporated in the foundation 10.

By placing the bolts 20 and 21 under high tension, the cylindrical structure comprising the concrete 68 is placed under heavy unit compressive loading from the upper end thereof downwardly to a level adjacent the lower end of the cylindrical structure, and the unit compressive loading is considerably greater than any upset tensional forces which must be overcome to prevent upset of the tower and foundation 10. As a result, the concrete foundation 68 is always under compression and never subject to alternating compression and tension forces.

SUMMARY OF THE INVENTION

The perimeter weighted foundation of the present invention incorporates the above described post-stressed annular foundation of my prior patents as a pier pedestal or pedestal section of the foundation of the present invention. The present invention differs from the structures disclosed in my prior patents in that the foundation of the present invention includes an expanded base positioned adjacent the bottom of the pedestal section which has a cylindrical perimeter wall that is substantially larger in diameter than the cylindrical wall of the pedestal section and that extends to a depth substantially below the bottom of the pedestal section. The expanded base also includes a generally horizontal disk-like spread section which interconnects the bottom of the pedestal section and the top of the perimeter wall or perimeter wall section. This combination greatly increases the foundation's resistance to an overturning moment by use of skin friction along the exterior sides of the perimeter wall and pedestal section and by the additional weight and size concentration at the perimeter of the foundation, including the back fill on top of the horizontal spread section.

The foundation of the present invention also eliminates alternating cyclical compression and tension loading stresses, thereby substantially increasing internal stiffness and reducing fatigue. Vertically extending anchor bolts in the pedestal section are sleeved in PVC or equivalent shielding to prevent bolt bonding with concrete for compression of the concrete as disclosed in my prior patents. Radially extending bolts are embedded horizontally in the disk-like spread section for reinforcement. The radially extending horizontal bolts are also sleeved in PVC or equivalent sheathing for high compression loading of the annular spread section. It has not been found necessary to post-tension the cylindrical perimeter wall and post-tension bolts are preferably omitted from this section. However, such bolts may be included as part of the present invention if high unit compression of the exterior perimeter wall section is desired.

The foundation of the present invention reduces time, and reduces cost by allowing excavation by conventional backhoes and/or track excavators. Further, the tensionless pedestal section can be assembled and poured at a fabrication yard and shipped as a precast component to the foundation site. The corrugated metal pipe (CMP) forms provide reinforcing steel and establish a boundary for the concrete pour. The bolt holes in the CMP provide support and positioning for the horizontal radial arrangement of the laterally extending bolts in the spread section, along with eliminating the need for temporary perimeter forms and reinforcing steel supporting chairs and blocks. The foundation may be poured continuously (monolithically) or sequentially, first the perimeter wall, then the spread section and finally the pedestal section. Alternatively, the pedestal section can be poured first, then the perimeter wall and finally the spread section in two separate pours.

The exterior cylindrical or perimeter wall section is made of concrete preferably formed between two corrugated metal pipes (CMPs). In one embodiment, the outer CMP of the perimeter wall is a few feet taller than the inner CMP of the perimeter wall in order to define the outer circumference of the horizontal spread section. Initially, a circular excavation having a diameter slightly greater than the diameter of the perimeter wall is dug to the depth of the pedestal section. An annular shaped trench for forming the perimeter wall is excavated to a depth of the desired bottom of the perimeter wall. In this embodiment, the initial circular excavation to the depth of the pedestal section leaves a raised perimeter section whose inner diameter is greater than the outer diameter of the pedestal section and whose outer diameter extends to the outer wall of the circular excavation. Then when the annular shaped trench for forming the perimeter wall is dug, a slightly raised annular berm-like earth ring is left inside the perimeter wall trench and above the bottom of the excavation for supporting the pedestal section.

The two CMPs forming the exterior and interior of the perimeter wall are placed into the perimeter wall excavation. Sand cement slurry is placed between the exterior of the CMPs and the sides of the perimeter wall excavation. The CMPs to form the pedestal section are then placed on the bottom of the interior circular shaped excavation and plumbed and properly centered within the interior of the CMPs for the perimeter wall section.

A first or lower set of radially extending bolts extend through the interior and exterior CMPs of the pedestal section and pass preferably to a mid-point between the interior and exterior CMPs of the perimeter wall section, at which point, the lower bolts are bent 90 degrees to extend downwardly between the two CMPs forming the perimeter wall. The horizontally extending portion of the radially extending lower bolts is jacketed to prevent engagement with the subsequently poured concrete. Threading is included on the terminal end of the lower bolts passing through the interior CMP of the pedestal section to receive suitable post-tensioning fasteners such as a large washer and nut. The opposite ends of the lower bolts which project downwardly between the CMPs of the perimeter wall do not include a protective sleeve so as to be able to form a strong bond with the subsequently poured concrete to strengthen the perimeter wall.

Progressively larger diameter circles of high strength cable are placed on top of the lower layer of radially extending bolts and secured at the cross-over intersections. These cables referred to as "tendons", are used instead of rebar to strengthen the horizontal spread section. The tendons are placed such that each successive tendon diameter preferably is approximately two feet greater than the preceding tendon diameter. The opposed ends of each tendon are preferably overlapped by approximately 60° or about eight feet.

Located above the first or lower layer of radially extending bolts is a second or upper layer of radially extending PVC sleeved bolts passing through the inner CMP of the pedestal section and out to the outer CMP of the perimeter wall section. The opposed ends of the upper radially extending bolts are secured interiorly of the pedestal section and exteriorly of the perimeter wall by suitable fastening, such as a large washer and nut, for post-tensioning of these bolts. These bolts also have a series of increasing diameter circles of tendons on their upper surface which are preferably aligned with the tendons on the lower layer of radially extending bolts.

Once the upper layer of radially extending bolts are secured to the circularly extending tendons, concrete is poured for the perimeter wall section and the steel reinforced slab forming the spread section. The annular earth berm below the underside of the spread section forms a depending annular shoulder on the bottom surface of the spread section adjacent the base of the pedestal section. Electrical and communication conduits are installed. The surrounding soil is backfilled to a finish grade from the edge of the excavation to the exterior CMP of the pedestal section. Concrete is then poured between the CMPs for the pedestal section to within about two feet of the finish grade. The radially extending bolts passing through sleeves in the spread section are post-tensioned preferably to about fifty percent of their yield strength. This places the concrete in the spread section under high unit compression load. The interior of the pedestal is backfilled. No compaction of the soil is required.

As in my prior patents, the center drain pipe, form rings, styrofoam block outs and leveling nuts are installed. The remaining pedestal portion is poured along with the concrete tower floor. The form rings and templates are removed for subsequent securing of the supported tower into place, and the vertical anchor bolts are post-tensioned to place the pedestal section in high unit load as described in my prior patents.

In an alternate embodiment of the present invention, the perimeter wall section and spread section can be formed as separate components. In addition, the annular shoulder on the bottom of the spread section can be omitted if desired. Instead of the interior and exterior CMPs for forming the perimeter wall having different heights, the interior and exterior CMPs of the perimeter wall section are about the same height. The two layers of post-tensioning bolts extend horizontally through the interior and exterior CMPs of the perimeter wall section as well as the interior and exterior CMPs of the pedestal section. The concrete for the perimeter wall section and spread section can then be poured separately and the generally horizontal bolts embedded in the spread section can be post-tensioned as described in the previous embodiment.

The concrete foundation of the present invention can be utilized on all sizes of wind turbines currently being commercially marketed and constructed, which range in size from 500 KW to 2500 KW. These towers range in height from the ground to the hub from 40 to 100 meters, and the weight of the towers, including the tower, blades, and nacelle (containing gear boxes, generators, etc.) connected atop the tower, range from 150,000 pounds to 700,000 pounds. The overturning moments for the larger units are from 6,000,000 to 50,000,000 ft-lbs. Further, by expanding the outer diameter of the perimeter wall in the present invention to 50 feet and increasing the thickness of the spread section to 6 feet, it is believed that the concrete foundation of the present invention could be designed to handle overturning moments up to as much as 100,000,000 ft-lbs, which would be encountered with tower heights in the neighborhood of 400 feet.

It is believed that the concrete foundation of the present invention is adaptable to very large overturning moments and is capable of supporting larger turbines than the tensionless foundations of my prior patents, which currently have depth limitations imposed by economic factors of around 35 feet. While the pedestal portion of the present invention can always be the same size as the tensionless hollow cylinder of my prior patents, the perimeter foundation of the present invention has the ability to extend the diameter of the perimeter wall to even greater diameters. The depth of the perimeter wall could approach 30 feet and the moment resistance of such a wall depth coupled with the increased diameters could support any foreseeable size tubular wind turbine tower.

Accordingly, it is a first object of the present invention to provide a post-tensioned concrete foundation which has increased resistance to overturning moments, especially for larger wind turbines and other large tower structures.

A further object of the present invention is to provide a post-tensioned concrete foundation which maximizes resistance to overturning by situating weight concentration and skin friction resistance at the perimeter of the foundation.

A still further object of the present invention is to provide a post-tensioned concrete foundation which has high upset resistance by including an expanded base to a pedestal section of the foundation.

Another object of the present invention is to provide a foundation in accordance with the preceding objects and in which the expanded base includes a cylindrical perimeter wall section spaced a substantial distance outward from the wall of the pedestal section and a horizontal spread section which interconnects the bottom of the pedestal section and the top of the perimeter wall section.

Still another object of the present invention is to utilize excavated soil as backfill to add weight to the pedestal section, the top of the spread section and the top of the perimeter wall section to resist overturning forces while using inexpensive on-site materials.

Yet another object of the present invention is to provide a post-tensioned concrete tower foundation having an expanded base which can be constructed without temporary independent forms and shoring.

Still a further object of the present invention is to provide a post-tensioned concrete foundation for weak soils such as with shallow ground water in which the top of the expanded base of the foundation can be positioned at, above, or below the ground water surface.

Yet a further object of the present invention is to provide a post-tensioned concrete foundation adaptable for areas with deep frost depths in which the top of the expanded base of the foundation is set below the frost line.

Still yet another object of the present invention is to provide a perimeter weighted post-tensioned concrete foundation in which the major components, the pedestal section, the spread section and the perimeter wall section, can be pre-assembled and hauled to a site for placement into a foundation excavation or poured concrete can be cast in place.

Still yet a further object of the present invention is to provide a perimeter weighted post-tensioned concrete tower foundation having a pedestal section and an expanded base which will conform to conventional forms of manufacture and provide a foundation that will be economically feasible, long lasting and relatively trouble free in use.

These and other objects of the invention, as well as many of the intended advantages thereof, will become more readily apparent when reference is made to the following description taken in conjunction with the accompanying drawings.

DETAILED DESCRIPTION OF THE PREFERRED EMBODIMENTS

Figure 1:
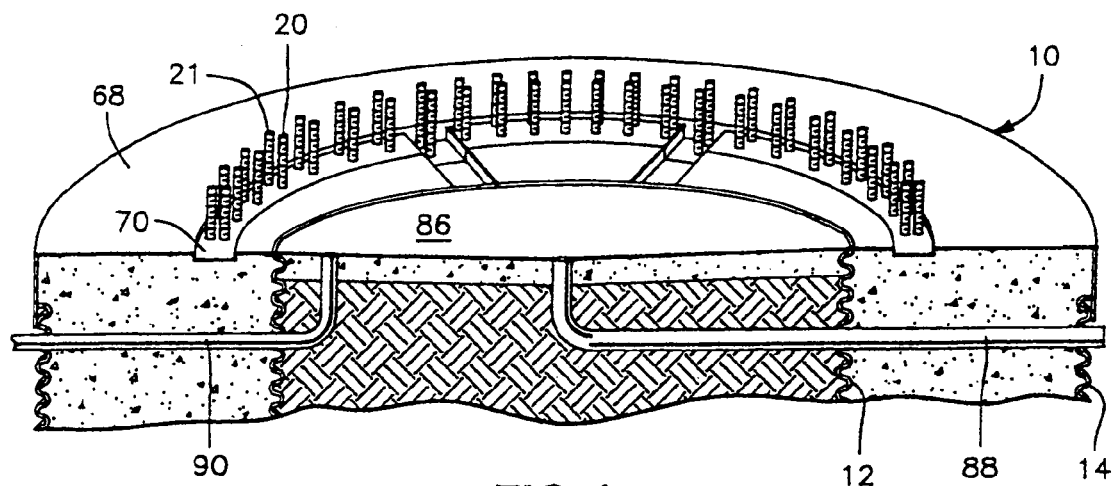
FIG. 1 is a fragmentary vertical sectional view of the upper portion of a completed concrete foundation constructed in accordance with my prior patents which comprises the pedestal section of the present invention.

Although only two preferred embodiments of the invention are explained in detail, it is to be understood that the embodiments are given by way of illustration only. It is not intended that the invention be limited in its scope to the details of construction and arrangement of components set forth in the following description or illustrated in the drawings. Also, in describing the preferred embodiments, specific terminology will be resorted to for the sake of clarity. It is to be understood that each specific term includes all technical equivalents which operate in a similar manner to accomplish a similar purpose.

Figure 3:
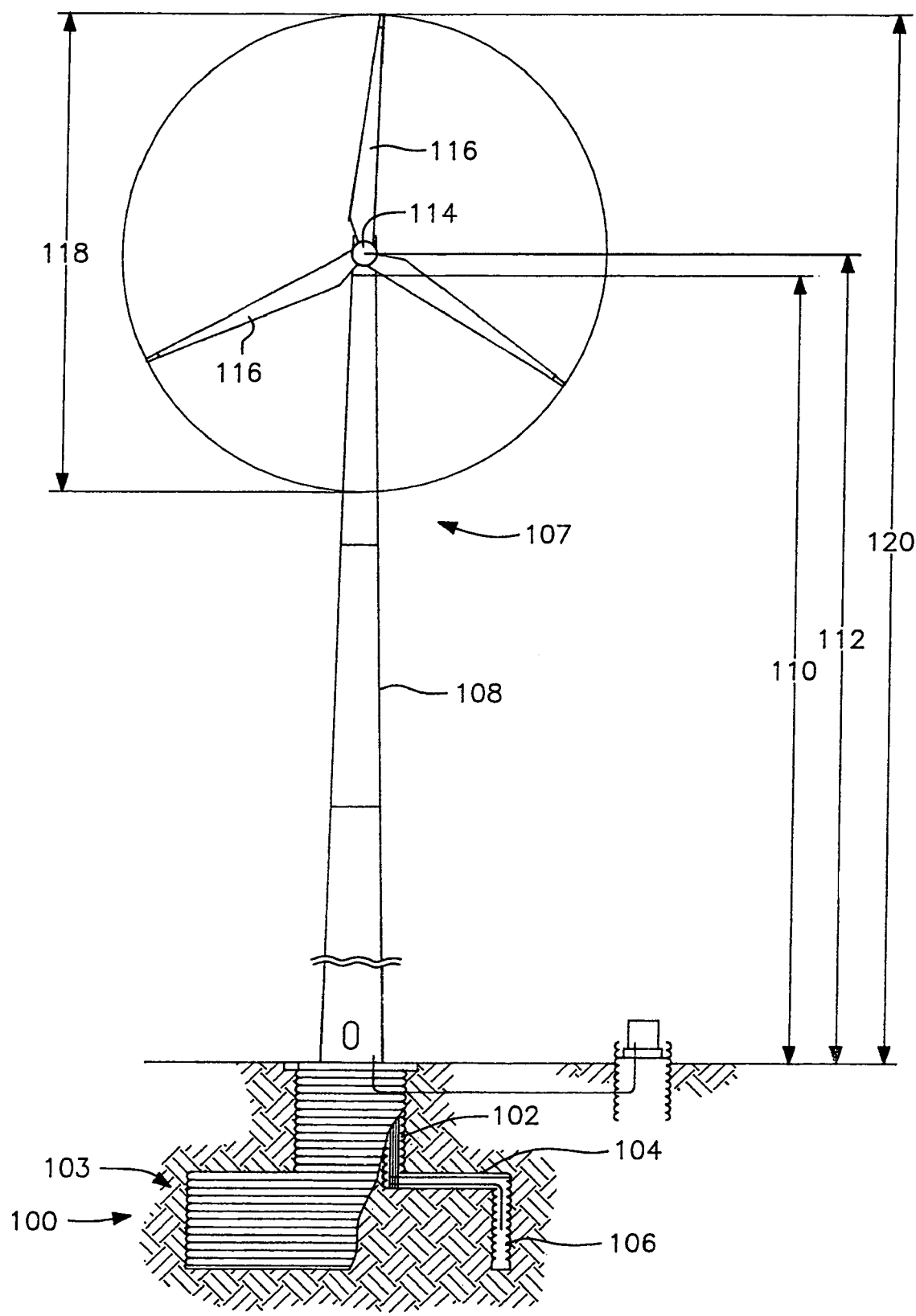
FIG. 3 is a side elevational view of an assembled wind turbine and supporting tower mounted on a perimeter weighted foundation of the present invention, shown partially in section.
Figure 4:
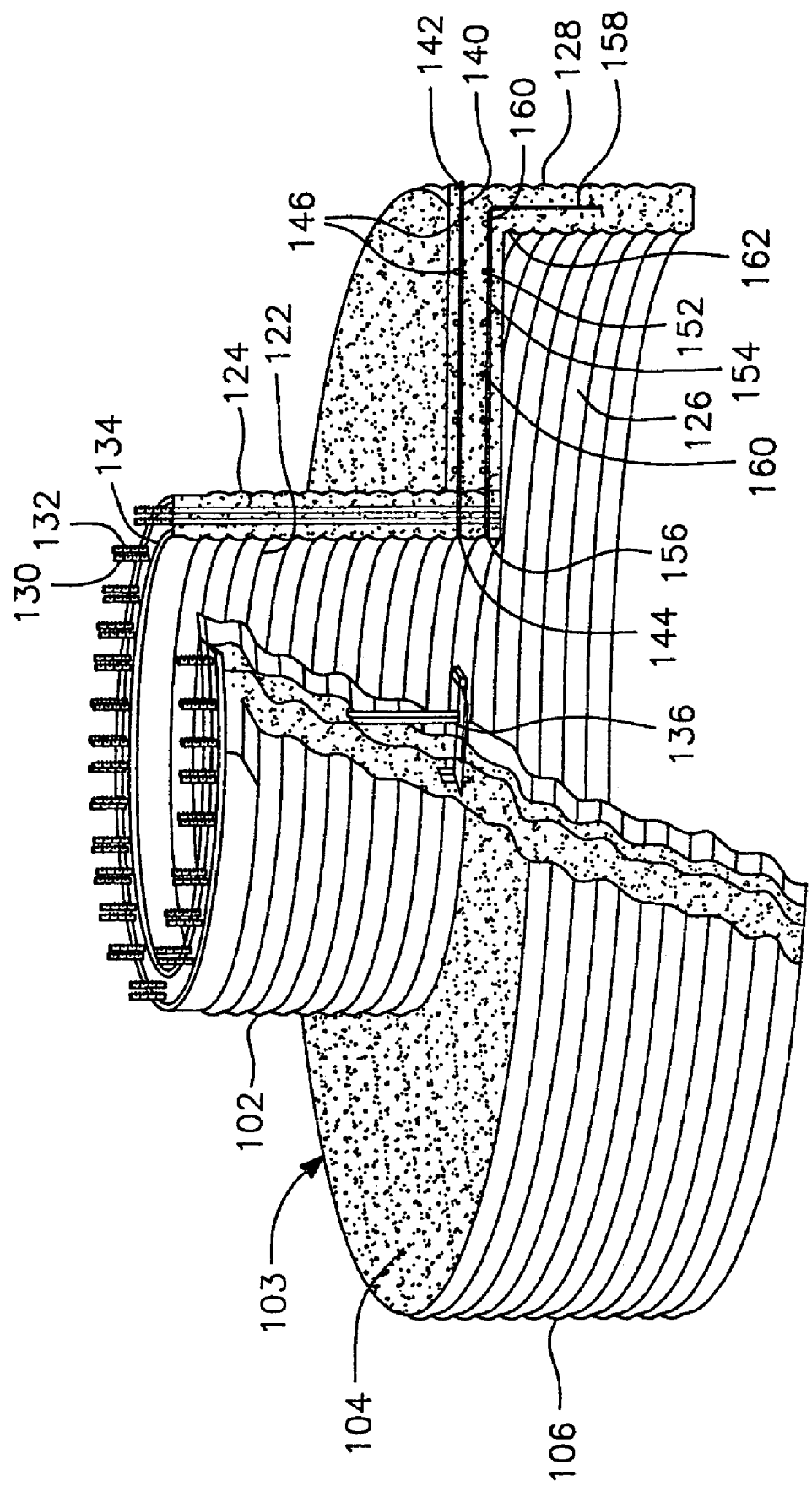
FIG. 4 is an inclined vertical sectional view of a perimeter weighted foundation in accordance with the present invention illustrating the interconnection of the perimeter wall section and pedestal section by a radially extending spread section and the details of the connection of the vertically extending post-tensioning anchor bolts extending in the pedestal section between a template and an embedment ring.
Figure 5:
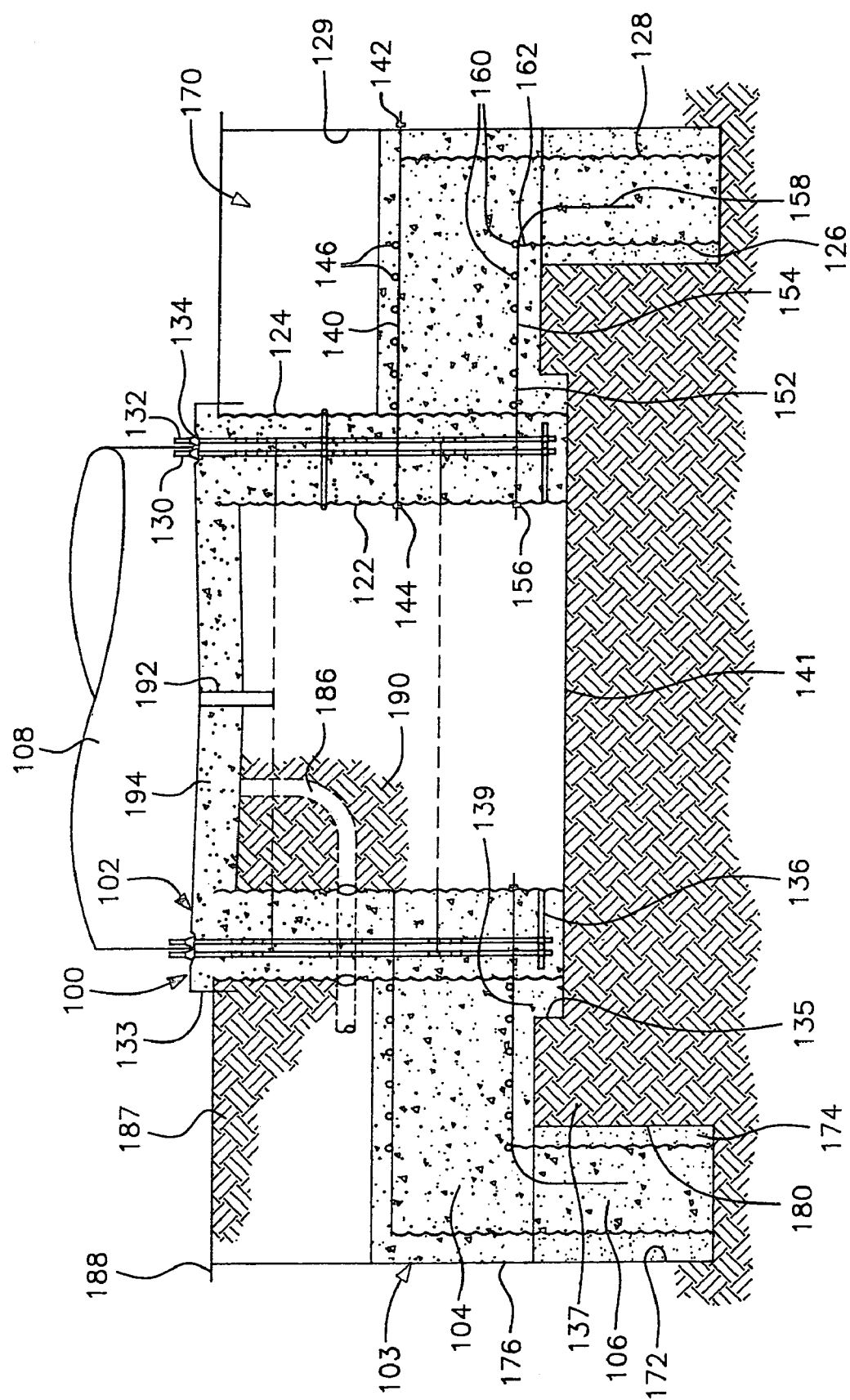
FIG. 5 is a vertical sectional view illustrating a modified form of the perimeter weighted foundation of FIG. 4 with the spread section including a depending shoulder on its bottom surface and the perimeter wall section positioned in an excavated circular trench extending below the bottom of the pedestal section and excavated soil backfilled on top of the spread section and within and surrounding the pedestal section.

Referring now more specifically to the drawings directed to the present invention, especially FIGS. 3, 4 and 5, the reference numeral 100 generally designates the perimeter weighted foundation of the instant invention. The foundation 100 includes a pier pedestal or pedestal section 102 and an expanded base, generally designated by reference numeral 103. The expanded base 103 includes a spread section 104 and a perimeter wall section 106. The spread section 104 interconnects the base of the pedestal section 102 and the perimeter wall section 106.

The foundation 100 may, as shown in FIG. 3, support a wind turbine, generally designated by reference numeral 107, formed by a tubular tower 108 which supports rotor blades 116 on a hub 114. In a typical wind turbine for which the present invention is especially adapted, the tower height 110 is approximately 230 feet and the hub height 112 is approximately 236 feet. The rotor diameter 118 is approximately 170 feet, and the overall wind turbine height 120 is approximately 321 feet.

As shown in FIG. 4, the pedestal section 102 is formed between an inner CMP 122 and an outer CMP 124. Similar to the pedestal section 102, the perimeter wall section 106, is formed between an inner CMP 126 and an outer CMP 128. Interconnecting the pedestal 102 and the perimeter wall section 106 is a spread section 104. The spread section 104 extends from the outer wall of the outer CMP 124 of the pedestal section to the outer CMP 128 of the perimeter wall section 106 to the side wall 129 of the excavation. Thus, the spread section 104 ties together the bottom of the pedestal section 102 and the top of the perimeter wall section 106 in forming the expanded base 103 for the pier pedestal 102.

With specific reference to FIGS. 4 and 5, extending vertically through the pedestal section 102 are two concentric rings of anchor bolts 130 and 132. The pedestal section 102, including the rings of anchor bolts 130, 132 extending between grout trough 134 or tower base and anchor or embedment ring 136, can be precast or poured in situ. When the top of the pedestal section is designed to extend above the ground surface, such as shown in FIG. 5, a removable form ring 133 is typically used to hold the concrete above the ground when the pedestal section is poured in situ. As stated previously, the pedestal section of the present invention is constructed in accordance with the teachings of my prior patents including high load post-tensioning of the bolts 130 and 132 after the concrete has hardened and cured.

To provide increased strength to the spread section 104 a first or lower layer of tensioning bolts 152 extend radially through the spread section on top of which is a second or upper layer of radially extending tensioning bolts 140. With respect to the upper layer of tensioning bolts 140, these bolts preferably extend from outside the outer CMP 128 of the perimeter wall section and are secured by a suitable fastener, such as a washer and nut assembly 142. The opposite ends of the upper layer of tensioning bolts 140 preferably extend through the inner CMP 122 of the pedestal section and are secured by a suitable tensions means, such as a washer and nut assembly 144. The bolts 140 are contained within a PVC sleeve or other sheathing so that the bolts 140 may be post-tensioned after hardening of the concrete by tightening the nuts 144 on the threaded inner ends of the bolts.

Figure 7:
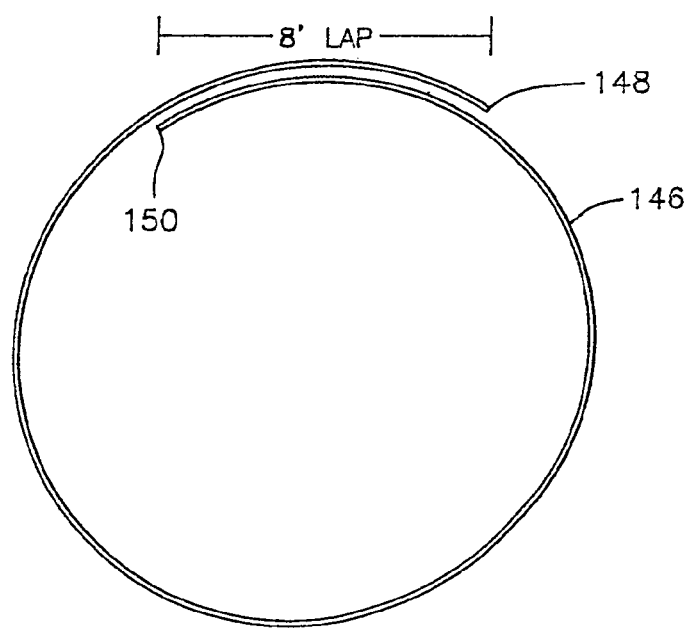
FIG. 7 is a plan view of a single tendon from FIG. 6, shown overlapped at its ends.

In addition, to provide added strength to the spread section 104, a series of concentric circles of reinforcing tendons 146 are laid on and secured to the top of the radially extending tensioning bolts 140. The tendons 146 located on top of tensioning bolts 140 are typically made up of two to seven strands, and preferably six strands, of high strength cable. The strands, preferably having a diameter of approximately 0.6 inches, have the strength of rebar having a diameter of approximately 1½ inches. The tendons formed from the strands as shown in a representative illustration in FIG. 7, have an outer end 148 overlapping an inner end 150 by an arc of about 60° or a length of approximately 8 feet.

The tensioning bolts 152 in the lower layer include a horizontally extending portion 154 terminating in a suitable tensioning means, such as a nut and washer assembly 156, located inside the inner CMP 122 of the pedestal 102. However, the opposite end portion 158 of the bolts 152 extends vertically downwardly into the perimeter wall portion 106 (discussed below). The horizontally extending portion 154 of the lower bolts 152 also includes a surrounding sleeve or sheathing as is used with bolts 140 as well as the bolts 130, 132. As with the sheathing of the vertically extending anchor bolts 130, 132 of the pedestal section 102, the shielding PVCs sleeve or pipe surrounding upper tensioning bolts 140 and the horizontal portion 154 of bolts 152 need not extend through the entire horizontal extent of the post-tensioning bolts 140 and 152. Rather, the shielding need extend only through as much of the central portions and as close to the ends as to allow the tensioning bolts to extend evenly through the concrete during the post-tensioning of the spread section 104. Located on top of the horizontally extending portion 154 of bolts 152 are a series of concentric circles of tendons 160. Each tendon 160 is typically made up of two to seven strands, and preferably six strands, of high strength cable preferably having the same dimensions as used in tendons 146.

The bolts 152 extend horizontally until reaching an upper edge or lip portion 162 of inner CMP 126 of the perimeter wall section 106. After passing over the lip portion 162, the bolts 152 are bent to extend downwardly and form vertical extensions 158 of bolts 152. Vertical extensions 158 are not isolated by a sleeve or the like and are intended to bond with the subsequently poured concrete forming the perimeter wall section 106 between the inner and outer CMPs 126, 128. Bolt extensions 158 aid in strengthening the concrete of the perimeter wall section 106 and in tying together the perimeter wall section 106 to the spread section 104 in forming the enlarged base 103 in accordance with the present invention.

As shown in FIG. 5, the spread section 104 may preferably be formed with a depending annular shoulder 139 on its bottom surface by excavating the hole for the pedestal section slightly deeper, thus leaving a perimeter dirt ring which forms a raised dirt berm 137 when the circular trench 172 is dug for the perimeter wall section 106. The inside shoulder 135 of the berm 137 forms the annular shoulder 139 adjacent the bottom of the outer CMP 124 of the pedestal section 102. The berm serves to seat the pedestal and can facilitate a pouring of the concrete in the pedestal before the other elements of the foundation. Further, the annular shoulder 139 further aids in securing the bottom of the pedestal section 102 to the spread section 104 and resisting upset forces placed on the foundation 100.

To support a wind turbine 107 having the dimensions above described, it has been found that a foundation 100 having the following dimensions can support the wind turbine against all anticipated upset forces. More specifically, the inner CMP 122 and the outer CMP 124 of the pedestal section 102 should have diameters of approximately 10 feet and 14 feet, respectively, and an overall height of approximately 9.5 feet. The diameters of the inner CMP 126 and outer CMP 128 of the perimeter wall section 106 are preferably about 26 feet and 30 feet, respectively. The inner CMP 126 preferably has a height of approximately 4.0 feet, and the outer CMP 128 has a height of approximately 7.25 feet. The spread section 104 has a thickness or depth of approximately 3.5 feet. The annular depending shoulder 139 of the spread section 104 is preferably about 1 foot high and about 1–2 feet in radial width. The vertical portion 158 of the lower bolts 152 will extend approximately two to three feet down into the perimeter wall between section CMPs 126, 128. Typically the length of vertical extention of the lower bolts is preferably about forty times the diameter of the bolts.

The assembly of the perimeter weighted foundation 100 according to the present invention will be described with reference to FIG. 5 and a typical installation having the above described dimensions. In FIG. 5, an excavation generally designated by reference numeral 170 is dug with a diameter of approximately 32 feet and a depth of approximately 7.5 feet. A central section 141 of the excavation 170 is dug down about another foot, thus leaving a raised perimeter dirt ring or berm 137 having a height of about one foot. The perimeter dirt ring 137 has an inner diameter which forms shoulder 135 that is about 1–2 feet larger than the outer diameter of the pedestal section 102. The depth of the central section 141 is approximately equal to the height of the pedestal section 102, or as shown in FIG. 5, slightly less than the height of the pedestal section if the top of the pedestal section is to extend above ground level. As shown in FIG. 5, the outer diameter of the excavation 170 at wall 129 approximates the outer diameter of the perimeter wall section 106. After the initial circular excavation 170, an annular trench or ring 172 is dug to a depth of approximately 4.75 feet, with an inner diameter of approximately 24 feet and an outer diameter of 32 feet, to accommodate the perimeter wall section 106.

The exterior and interior CMPs 128 and 126 are placed into the annular excavation 172. A sand cement slurry 174 is preferably placed along the exterior sides of CMPs 126 and 128 within the walls 176 and 180 to the top of trench 172 to provide outside lateral support to the CMPs 126 and 128. The CMPs 122, 124 of the pedestal section 102 are then placed on the bottom of the central section 141 of excavation 170 and properly aligned and plumbed centrally within CMPs 126, 128. The additional supporting structure of the pedestal section, including tensioning anchor bolts 130, 132 and other structure, as described in my prior patents, is assembled.

Then, the lower layer of bolts are placed in position in the spread section 104, extending through the CMPs 122, 124 of the pedestal section and over the edge 162 of CMP 126 and downwardly into the perimeter wall section 106. The circular steel tendons 160 are placed on top of the horizontally extending portion 154 of bolts 152 and secured at their cross-over intersections. The top layer of bolts 140 are then placed into position by securing them to extend through the CMPs 122, 124 of the pedestal section 102 and the exterior CMP 128 of the perimeter wall section 106.

A first pour of concrete fills the spaces between the interior and exterior CMPs 126, 128 of the perimeter wall section as well as on top of the bottom of the excavation 170 to fill the area radially beyond the exterior CMP 124 of the pedestal section, across the top of the inner sand cement slurry 174, over the perimeter wall section 106, and preferably radially beyond the exterior CMP 128 over the outer sand cement slurry 174 to the wall 129 of the excavation 170, as shown in FIG. 5. This forms the spread section 104 and the perimeter wall section 106 comprising the enlarged base of the foundation.

Electrical and communication conduit 186 is then installed through the CMPs 122, 124. The area on top of the spread section 104 and radially outwardly from the CMP 124 to the interior wall 129 of the excavation 170 is then filled with backfill 187, up to the finished grade level 188.

A second pour of concrete is then poured between the inner and outer CMPs 122, 124 of the pedestal section to within about two feet of the ultimate top of the pedestal. Upon hardening and curing of the concrete, the two rings of bolts 130, 132 as well as the two layers of bolts 140, 154 are post-tensioned by tightening the tensioning nuts on the threaded bolt ends to approximately fifty percent of their yield strength. This imparts the desired high unit compression on the concrete of the pedestal section and the spread section. The interior 190 of the pedestal section 102 is then backfilled without compaction. A center drain pipe 192 is positioned in place and the remainder of the pedestal section is poured to form a concrete tower floor 194 for mounting of a tower 108 as shown in FIG. 3.

Figure 2A:
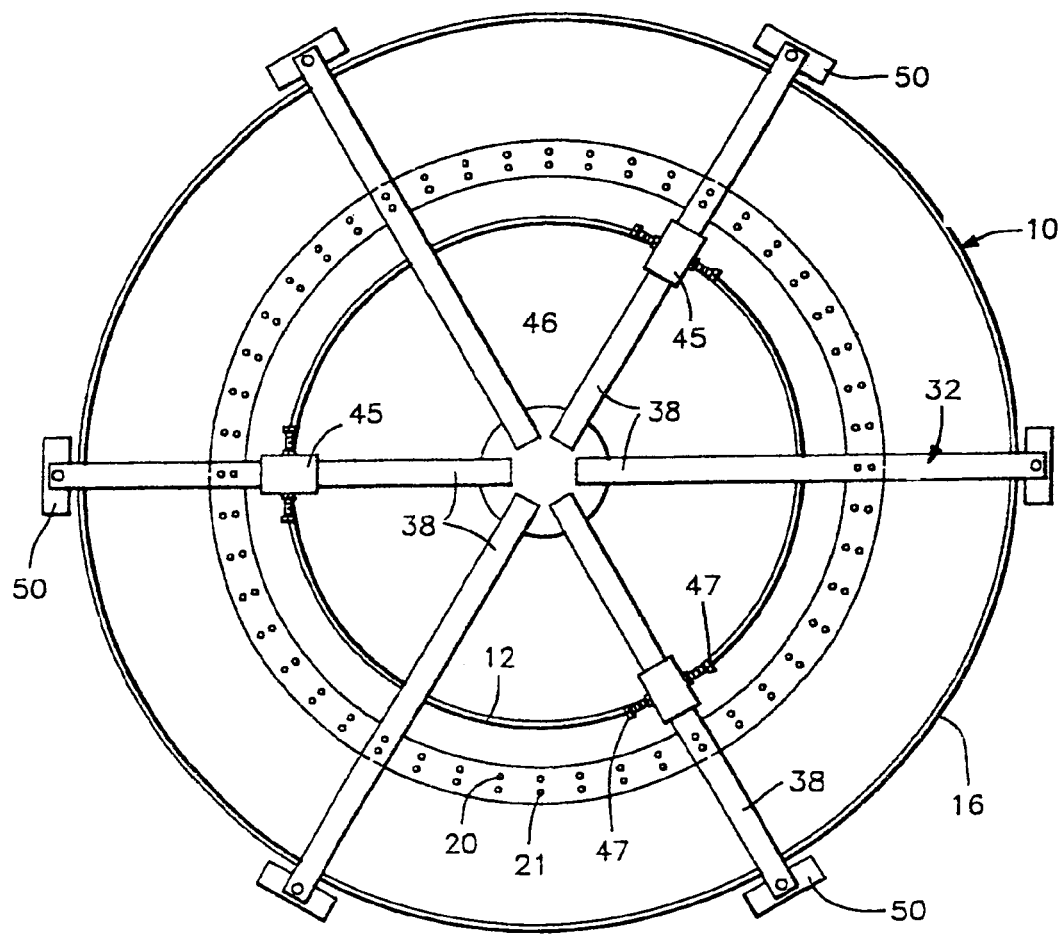
FIG. 2A is a top plan view of the assembled components illustrated at the top of FIG. 2.
Figure 2:
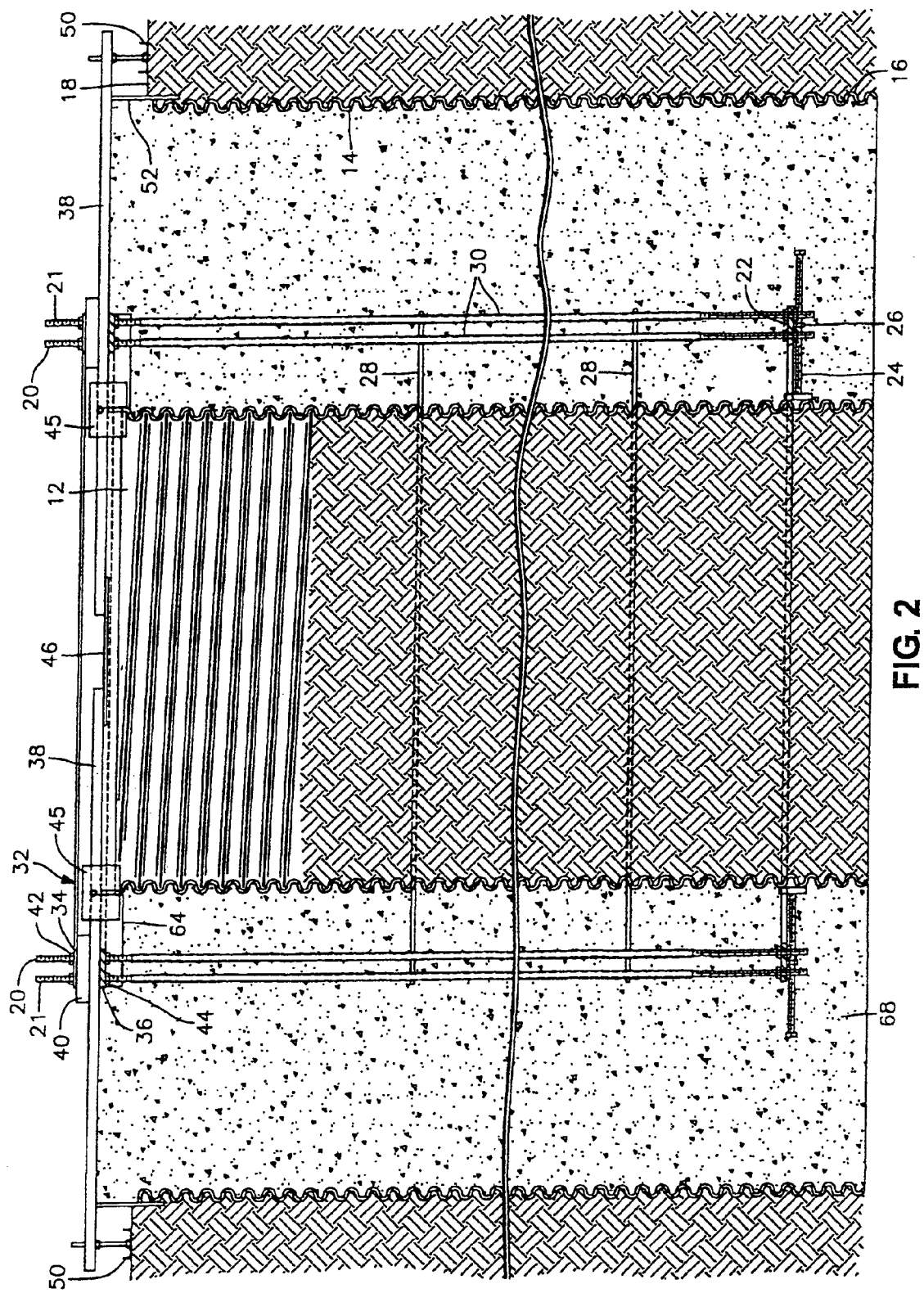
FIG. 2 is a fragmentary vertical sectional view illustrating the concrete foundation of FIG. 1 immediately after pouring of the concrete thereof.

As may be seen from FIG. 2, the backfill within the inner pipe 12 may be completed considerably below the surface of the ground 18. In such instance, the interior of the upper portion of the pipe 12 may be used to store maintenance equipment, electrical control equipment or other equipment, in which case the lower end of the tower will be provided with a door opening. On the other hand, the back fill within the inner pipe 12 may be completed to substantially ground level and provided with a poured concrete cap or floor 86, as shown in FIG. 1. The cap or floor 86 may be sloped toward the center thereof and provided with a drainage conduit 88 and conduit 90 for electrical conductors also may be incorporated in the foundation 10.

Figure 6:
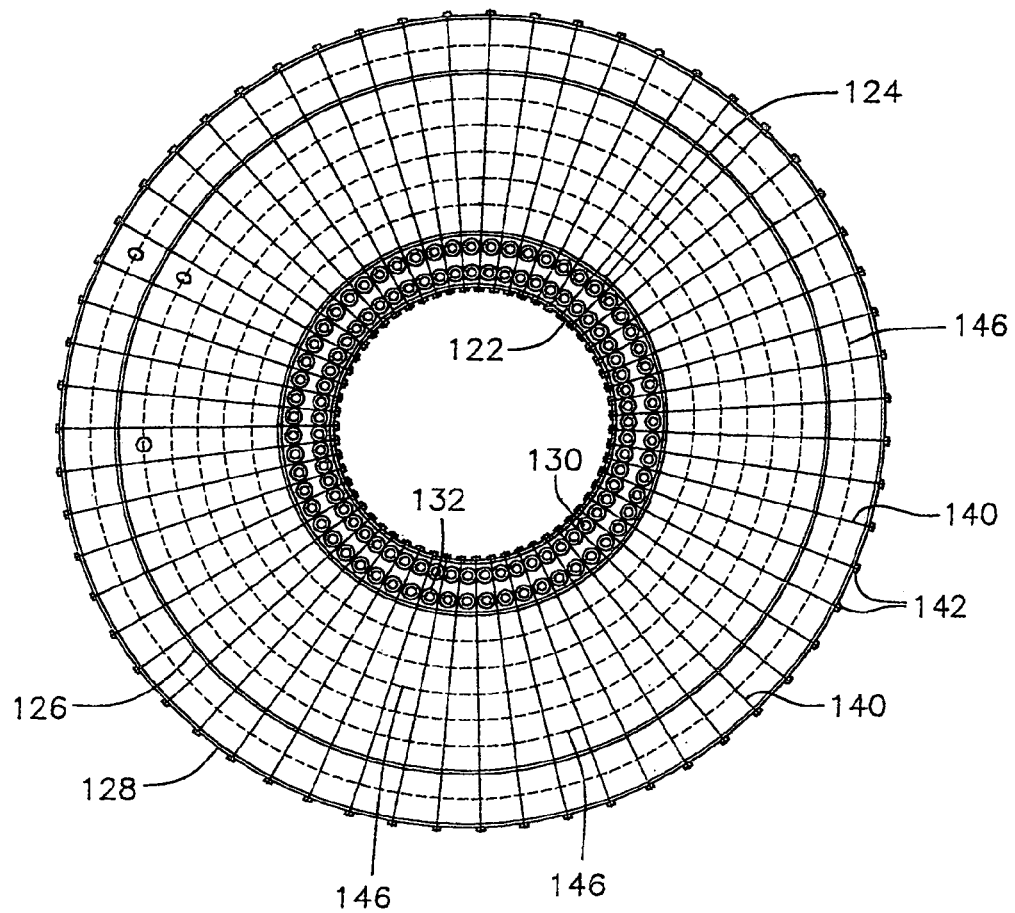
FIG. 6 is a top plan view of a pattern of the bolts in the perimeter weighted foundation of FIG. 4 including the vertically extending bolts located in the pedestal section and the upper layer of horizontal bolts extending radially through the CMPs of the pedestal section, outwardly across the spread section and through the CMPs of the perimeter wall section, as well as the concentric circles of tendons interconnecting the radially extending bolts in the spread section.
Figure 8:
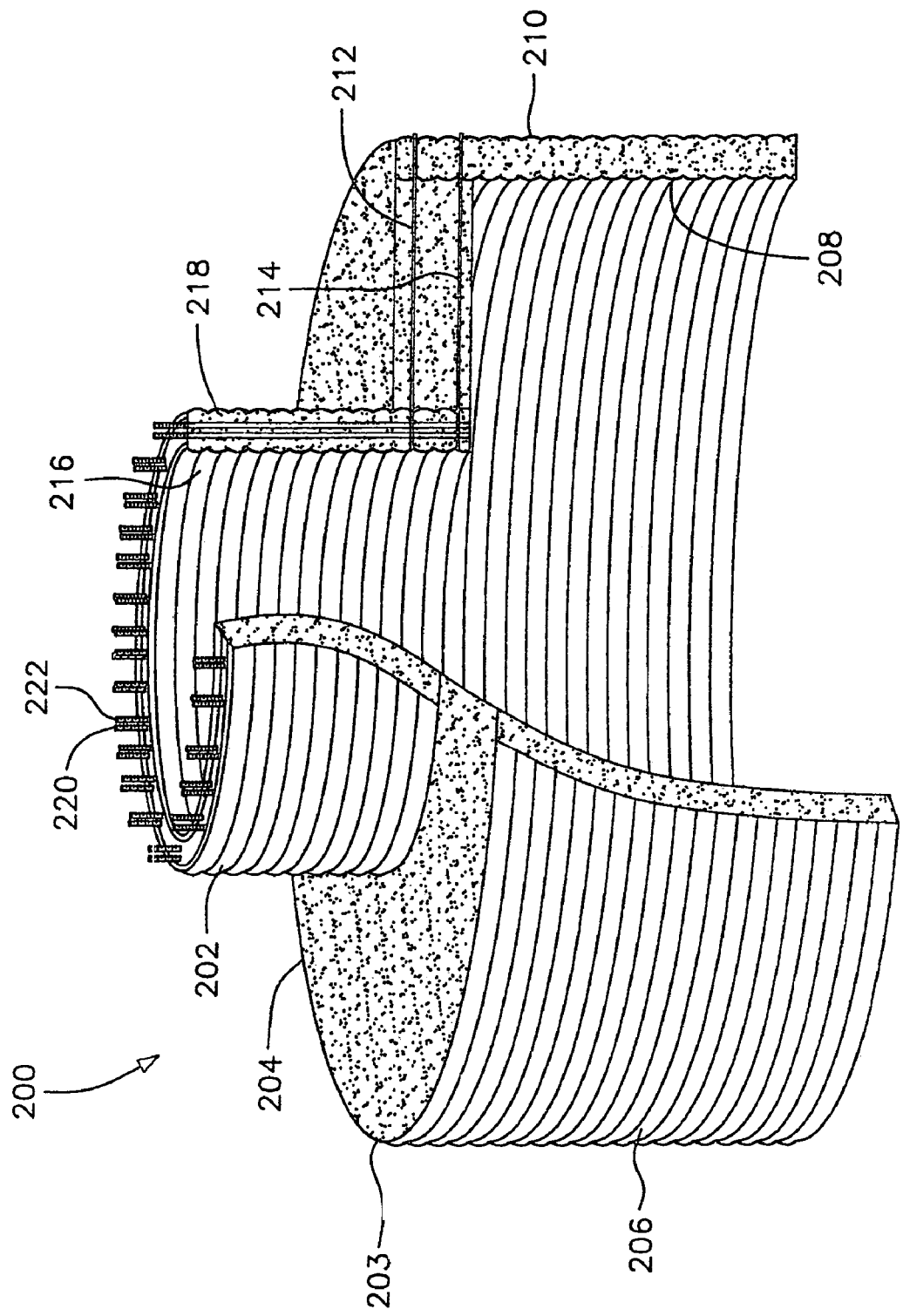
FIG. 8 is an inclined vertical sectional view of an alternate embodiment of the perimeter weighted foundation of the present invention, similar to FIG. 4, illustrating the interconnection of the perimeter wall section and pedestal section by an annular spread section and the details of the connection of post-tensioning anchor bolts extending vertically between a template and an embedment ring in the pedestal section and post-tensioning bolts extending horizontally through the pedestal section, the spread section and the perimeter wall section.
Figure 9:
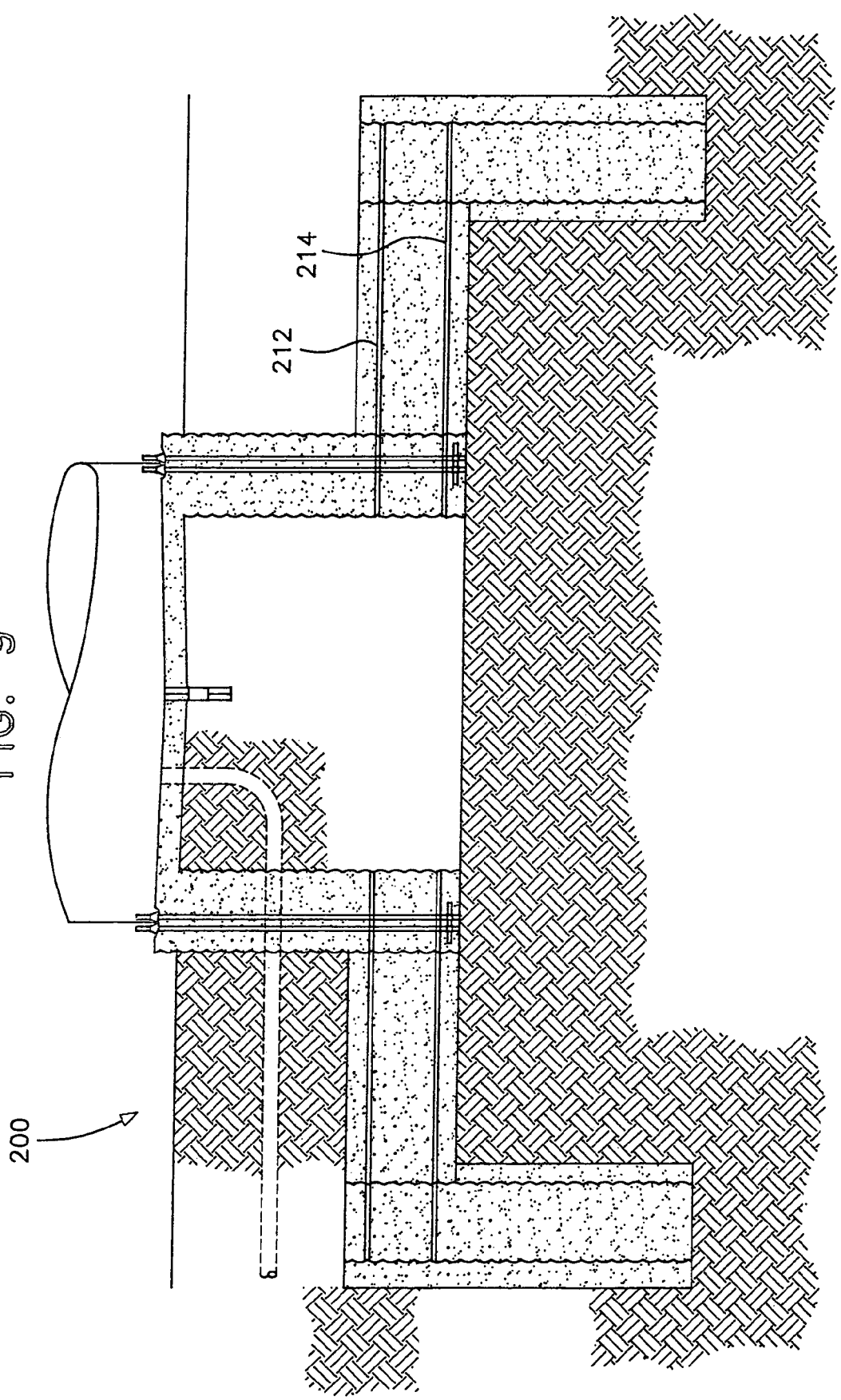
FIG. 9 is a vertical sectional view, similar to FIG. 5, illustrating the perimeter weighted foundation of FIG. 8, with the perimeter wall section positioned in an excavated circular trench extending below the bottom of the pedestal section and excavated soil backfilled on top of the spread section within and surrounding the pedestal section.
Figure 10:
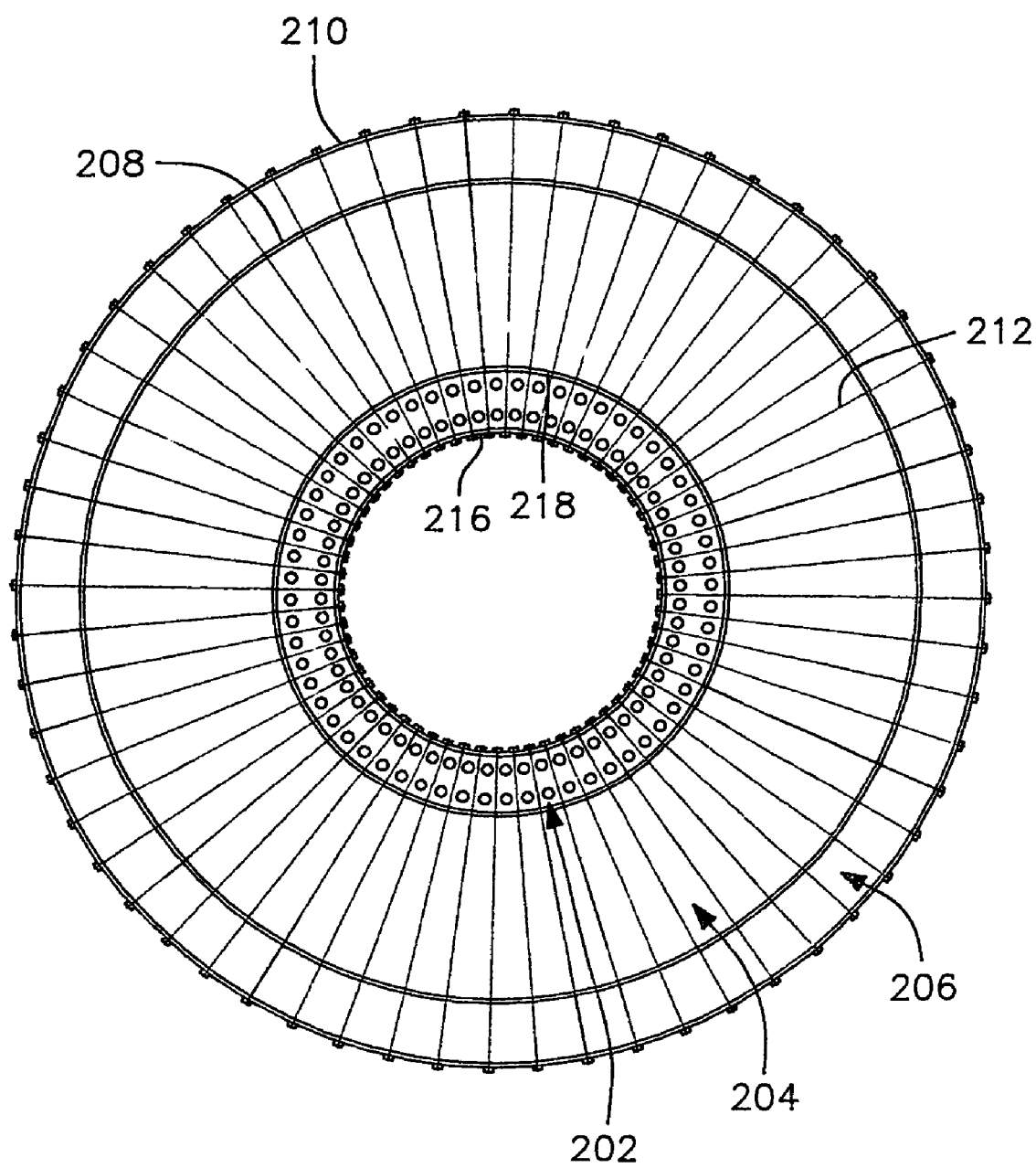
FIG. 10 is a plan view of a pattern of the bolts in the perimeter weighted foundation of FIG. 8 including the vertically extending bolts located in the pedestal section and the upper layer of horizontal bolts extending radially through the CMPs of the pedestal section, outwardly through the spread section and through the CMPs of the perimeter wall section, as well as the concentric circles of tendons interconnecting the radially extending bolts in the spread section.

In an alternate embodiment, as shown in FIGS. 8 through 10, a perimeter weighted foundation 200 includes a pier pedestal or pedestal section 202 and an enlarged base 203. The enlarged base 203 includes a spread section 204 and a perimeter wall portion 206. The difference between the embodiment of FIGS. 8 through 10 and the embodiment of FIGS. 3 through 7, is that the interior CMP 208 of the perimeter wall portion in FIG. 9 is the same height as that of the exterior CMP 210. In addition, the lower layer of radially extending tensions bolts 214 extend horizontally to the same extent as the upper layer of tensioning bolts 212. Both layers of bolts 212, 214 extend through interior and exterior CMPs 208, 210 of the perimeter wall section 206 as well as through the interior and exterior CMPs 216, 218 of the pedestal section 202. This arrangement is also shown in FIG. 9. As is shown in FIG. 10, the tendons 146, 160 associated with the upper and lower layers of bolts 140, 154 in the embodiment of FIG. 6 are absent in the embodiment of FIGS. 8 and 10.

The three sections of the foundation 200 may be pre-cast and delivered to a remote site. Alternatively, the same concrete pour order as was described with respect to FIG. 5 may be followed. After supporting the CMPs 208,210 with cement sand slurry backfill, the perimeter wall section 206 and spread section 204 are poured, followed by a pouring of the pedestal section 202. Moreover, each of the perimeter wall section 206, the spread section 204 and the pedestal section 202 could be poured separately, if desired. After the concrete for all three sections has hardened and cured, all of the vertically extending bolts 220, 222 in the pedestal section and the horizontally extending bolts 212, 214 in the spread section are post-tensioned to the desired heavy unit compressive loading by threading the tensioning nuts on the bolt ends. The perimeter weighted foundation 200 has all of the advantages of the perimeter weighted foundation 100, as described with reference to FIGS. 5 through 7.

The concrete pier foundation of the present invention is maintained under heavy compression loading considerably in excess of expected tension forces when resisting upset of a supported tower, especially tall towers and structures, in the manner described in my prior patents. The concrete in the pier foundation of the present invention is heavily post-tensioned in the vertical direction in the pedestal section and in the horizontal direction in the spread section after the concrete has hardened and cured to thereby stabilize tension and compression forces. The post-tensioning of the concrete in the pedestal section avoids formation of failure loci at the upper surface of the concrete where the supported structure is attached.

As also described in my prior patents, the tensioned compression anchor bolts 130, 132 are incorporated into the pedestal section of the foundation in a manner such that they may be periodically retorqued and substantially fully removed from the bores in which they are received in the event it becomes necessary to remove the foundation, in which instance the anchor bolt receiving bores may be used as chambers to contain blasting material.

While the concrete foundation of the present invention has been described as having a cylindrical pedestal, and by excavating a circular excavation with an annular shaped trench for forming the perimeter wall and an annular berm like earth ring, it will be appreciated by those skilled in the art that the pedestal and the excavation including the trench and berm do not have to be cylindrical or circular. If desired, the pedestal and the excavations can be in a polygon shape, thus resulting in a concrete foundation in which the pedestal, perimeter wall and shoulder 139 are in the shape of a polygon.

In addition, some circumstances could arise in which it may be desirable to partially or completely fill the central portion of the pedestal with concrete, instead of backfilled soil. As well, it may be possible under some circumstances to eliminate the CMPs for forming the perimeter wall section and pour the perimeter wall directly within the excavated trench. However, under such circumstances, a rebar cage should be properly placed in the perimeter wall excavation in order to form reinforced concrete for the perimeter wall.

The foregoing description should be considered as illustrative only of the principles of the invention. Since numerous modifications and changes will readily occur to those skilled in the art, it is not desired to limit the invention to the exact construction and operation shown and described, and, accordingly, all suitable modifications and equivalents may be resorted to, falling within the scope of the invention.

I claim:

1. A method of forming a foundation preparatory to mounting a structure base on said foundation, said foundation including a pedestal section and a perimeter wall section and a spread section interconnecting said pedestal section, and said perimeter wall section, said method comprising:

excavating a generally circular or polygon ground pit having outer dimensions slightly greater than dimensions of said perimeter wall section and a height approximately equal to or slightly less than the height of said pedestal section, excavating a trench generally around an outer perimeter of said ground pit, said trench having outer dimensions substantially equal to the outer dimensions of the ground pit and inner dimensions slightly less than inner dimensions of said perimeter wall section and to a depth slightly less than a height of the perimeter wall section, pouring concrete into said trench and onto a portion of a base of the ground pit to form said perimeter wall section and said spread section, backfilling soil on top of the perimeter wall section and the spread section after the concrete thereof has cured, pouring concrete within the backfilled soil to form the pedestal section, and backfilling soil within the pedestal section.

2. A method of pouring a foundation as claimed in claim 1, wherein the concrete for the perimeter wall section is poured between an inner and an outer corrugated metal pipe.

3. A method of pouring a foundation as claimed in claim 2, wherein the concrete for the pedestal section is poured between another set of inner and outer corrugated metal pipes.

4. A method of pouring a foundation as claimed in claim 1, wherein at least one layer of radially extending bolts is placed in said spread section to extend between the pedestal section and the perimeter wall section prior to pouring of said concrete.

5. A method of pouring a foundation as claimed in claim 4, wherein a plurality of concentric circles of tendons are placed on the at least one layer of radially extending bolts.

6. A method of pouring a foundation as claimed in claim 5, wherein each of the tendons overlap at opposite ends.

7. A method of pouring a foundation as claimed in claim 4, wherein the at least one layer of radially extending bolts is post-tensioned after the concrete has hardened and cured.

8. A method of pouring a foundation as claimed in claim 1, wherein a wind tower is placed on top of the pedestal portion.

9. A method of forming a concrete foundation including a pedestal section, a perimeter wall section and a spread section interconnecting a lower end portion of said pedestal section, and an upper end portion of said perimeter wall section, said method comprising:

excavating a ground pit having outer dimensions slightly greater than dimensions of said perimeter wall section and a height approximately equal to or slightly less than the height of said foundation, excavating a trench generally around an outer perimeter of said ground pit, said trench having outer dimensions substantially equal to the outer dimensions of the perimeter wall section and inner dimensions slightly less than inner dimensions of said perimeter wall section and to a depth slightly less than a height of the perimeter wall section, pouring concrete into said trench and onto a portion of a base of the ground pit to form said perimeter wall section and said spread section, backfilling soil on top of the perimeter wall section and the spread section to an inner dimension slightly greater than the outer dimension of a lower portion of the pedestal section after the concrete thereof has cured, and pouring concrete within the backfilled soil to form the pedestal section.

10. A method of pouring a foundation as claimed in claim 9, wherein the concrete for the perimeter wall section is poured between an inner and an outer corrugated metal pipe and the concrete for the pedestal section is poured between another set of inner and outer corrugated metal pipes, at least one layer of radially extending bolts is placed in said spread section to extend between the pedestal section and the perimeter wall section prior to pouring of said concrete, a plurality of concentric circles of tendons having overlapping ends placed on the at least one layer of radially extending bolts, said at least one layer of radially extending bolts being post-tensioned after the concrete has hardened and cured.

11. A method of pouring a foundation as claimed in claim 10 including backfilling soil within said inner corrugated metal pipe of said pedestal section.

12. A method of pouring a foundation as claimed in claim 9 including backfilling soil within said pedestal section.

* * * * *